(12) United States Patent
Oozeki et al.

(10) Patent No.: US 8,307,381 B2
(45) Date of Patent: Nov. 6, 2012

(54) OPTICAL PICKUP DEVICE AND OPTICAL DISK DRIVE APPARATUS

(75) Inventors: Yoshio Oozeki, Yokohama (JP); Rika Nomura, Yokohama (JP); Taketoshi Moriyama, Fujisawa (JP); Katsumi Kuroguchi, Fujisawa (JP); Kazumi Takahashi, Toyokawa (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 730 days.

(21) Appl. No.: 12/425,435

(22) Filed: Apr. 17, 2009

(65) Prior Publication Data

US 2010/0002561 A1    Jan. 7, 2010

(30) Foreign Application Priority Data

Jul. 4, 2008    (JP) ................................. 2008-175800

(51) Int. Cl.
    *G11B 7/12*    (2006.01)
(52) U.S. Cl. ........................................................ 720/600
(58) Field of Classification Search .................... 720/600
    See application file for complete search history.

(56) References Cited

U.S. PATENT DOCUMENTS

| 7,228,553 B2* | 6/2007 | Lee et al. ........................ 720/683 |
| 7,484,229 B2* | 1/2009 | Miyagi ........................... 720/683 |
| 7,830,759 B2* | 11/2010 | Horiguchi ................... 369/44.32 |
| 7,873,970 B2* | 1/2011 | Arai et al. ...................... 720/671 |
| 2008/0080340 A1* | 4/2008 | Nishiyama et al. ......... 369/44.37 |

FOREIGN PATENT DOCUMENTS

| JP | 2001-143294 | 5/2001 |
| JP | 2004-178626 | 6/2004 |
| JP | 2004-355754 | 12/2004 |
| JP | 2007-035238 | 2/2007 |
| JP | 2007-294004 | 11/2007 |
| JP | 2008-097771 | 4/2008 |
| WO | WO 2006/118037 A1 | 11/2006 |

\* cited by examiner

*Primary Examiner* — Mark Blouin
(74) *Attorney, Agent, or Firm* — Antonelli, Terry, Stout & Kraus, LLP.

(57) ABSTRACT

An optical pickup device includes an optical part module having a light emitting device and an optical pickup case to which the optical part module is fixed by way of an adhesive, in which the optical part module is adhesively fixed by disposing a bonding surface of the optical part module to the optical pickup case at least at two positions on lateral surfaces of the optical part module putting an optical axis therebetween, and a bonding distance L in the lateral surface between the optical part module and the optical pickup is defined as: 40 μm<L<570 μm, whereby the optical pickup device can maintain an optimal position at a high positional accuracy without lowering a bonding strength even when a stress due to an external load by bending moment or circumstantial changes is caused to the optical part module, particularly in the case where the optical pickup device is thin.

3 Claims, 8 Drawing Sheets

OPTICAL PICKUP DEVICE AND OPTICAL DISK DRIVE APPARATUS

BACKGROUND OF THE INVENTION

The present invention concerns an optical pickup device used for reading and writing optical recording media such as compact disks (CD), digital versatile disks (DVD), and blue-ray disks (BD), or an optical disk drive unit incorporated with the optical pickup device.

The optical pickup device used for reading and writing optical recording media such as CD, DVD, and BD, or the optical disk drive apparatus incorporated with the optical pickup device includes an optical system of guiding a light emitted from a light emitting device such as a laser diode by way of various types of lenses, prisms, mirrors, etc. to an object lens and focusing the same on an optical recording medium and an optical system of receiving a light returned from the optical recording medium by an optoelectronic conversion device by way of an object lens and other various kinds of lenses, prisms, and mirrors and converting an optical output into an electric signal. Among them, it is necessary that an optical part module having a modularized laser diode is fixed to an optical pickup case at an optimal position by using an adhesive with an optical point of view. Therefore, in the structure of adhesively fixing the optical part module, only the front surface of the optical part module is bonded with a view point of positional stability.

As the thickness of the optical pickup device is decreased, in a case of a structure of bonding a thin optical part module only at the front surface, a load from a flexible printed substrate or an external load tends to exert like a binding moment on the bonding portion to result in a problem of lowering the bonding reliability such as deterioration of impact resistance. Further, in a case of a structure of adhesively fixing the optical part module bonded not only at the front surface but also at the lateral surface, while the resistance to the bending moment increases, a stress due to circumstantial changes is generated directly to the bonding portion at the lateral surface. Accordingly, peel at the bonding boundary proceeds gradually to bring about a problem of lowering the bonding reliability.

Accordingly, for a thin optical pickup device, it is necessary to provide an adhesively fixing technique capable of maintaining an optimal position at a high positional accuracy even in a case when a stress due to an external load by bending moment or due to circumstantial changes is generated to the optical module.

For the structure of adhesively fixing a laser unit to improve the positioning reliability thereof, JP-A No. 2004-178626 discloses that an optical pickup having high reliability also against repulsion from a flexible substrate and circumstantial changes can be provided in an optical pickup in which an adhesive is filled in a gap between an optical pickup case and a plate for holding a laser unit for adhesively fixing them, by forming a concave portion or a convex portion at two positions on one bonding surface of a plate for holding the laser unit.

SUMMARY OF THE INVENTION

In the structure of the existent technique described above, a laser unit is bonded only on both lateral surfaces to an optical pickup case and a step difference is formed to the bonding portion in the direction of the thickness. Accordingly, in a case of a thick optical pickup device, repulsion from the flexible substrate can be suppressed to ensure a high positional accuracy. However, as the thickness of the optical pickup device is decreased, since the thickness of the bonding portion is also decreased, it tends to suffer from the effect of the repulsion from the flexible substrate thereby resulting in a problem of tending to cause positional displacement. Further, for circumstantial changes, it involves a problem of positional displacement of the laser unit due to the different structure between the bottom surface and the upper surface of the lateral bonding and a problem that the bonding reliability is lowered due to gradual proceeding of peel at the bonding boundary because a stress by the circumstantial changes is generated directly to the bonding portion on the lateral surface.

On the structure of the existent technique described above, the bottom of the laser unit is covered with the optical pickup case. Accordingly, in a case of fixing an optical part by using a UV-ray curable adhesive, since the irradiation direction of UV-rays is restricted only in one direction due to the adhesive fixing structure of the laser unit, curing property in the direction of the depth of the adhesive may possibly become insufficient.

In view of the above, the present invention intends to provide an optical pickup device not suffering from the lowering of bonding strength and capable of maintaining the position at a high positional accuracy even in a case where a stress is generated to an optical part module due to external load by bending moment or due to circumstantial changes to a thin optical pickup device, as well as an optical disk drive unit having the optical pickup device described above.

In accordance with a first aspect of the invention, for attaining the foregoing, there is provided an optical pickup device having at least an optical part module and an optical pickup case to which the optical part module is adhesively fixed by an adhesive, in which a bonding surface of the optical part module to the optical pickup case is disposed at least at two positions on lateral surfaces of the optical part module putting an optical axis of the optical part module therebetween, and a bonding distance L on the lateral surface between the optical part module and the optical pickup case is within a range of: 40 µm<L<570 µm.

Further, in accordance with another aspect of the invention, there is provided an optical pickup device having at least an optical part module and an optical pickup case to which the optical part module is adhesively fixed by an adhesive, in which a bonding surface of the optical part module to the optical pickup case is disposed at least at two positions on lateral surfaces of the optical part module putting an optical axis of the optical part module therebetween, a concave portion or a convex portion is formed to the bonding surface of at least one of the optical part module and the optical pickup case, and a bonding distance L at the lateral surface between the optical part module and the optical pickup case is within a range of: 40 µm<L<950 µm.

In a preferred embodiment of the invention, the bonding surface is disposed also to at least one portion of a front surface and a transition portion from the front surface to the lateral surface of the optical part module.

In another preferred embodiment of the invention, a concave portion or a convex portion formed to the bonding surface has an identical constant shape such that UV-rays for curing adhesive can be irradiated to the adhesive.

In accordance with a further aspect of the invention, an optical disk drive unit has the optical pickup device described above.

In accordance with the invention, in a thin optical pickup device, since development of cracks generated by the circumferential changes can be suppressed even in a case where the optical part module is bonded at least on the lateral surface to the optical pickup case, an optimal position can be maintained at a high positional accuracy without lowering the bonding strength.

Further, in accordance with the invention, a further higher positional accuracy can be maintained because the bonding strength can be improved greatly by bonding the optical part module at the front surface, the transition portion from the front surface to the lateral surface, and the lateral surface.

Further, a high positional accuracy can be maintained even when an impact load generated upon dropping or the like or a load due to wirings to the optical part module exerts as a bending moment.

BRIEF DESCRIPTION OF THE DRAWINGS

FIGS. 2A to 2C show an embodiment of adhesively fixing an optical part module to an optical pickup case of the invention, in which

FIGS. 3A and 3B show another embodiment of adhesively fixing a part module to an optical pickup case in which

FIGS. 5A and 5B show a further embodiment of adhesively fixing a part module to an optical pickup case, in which

FIGS. 6A and 6B show a still further embodiment of adhesively fixing a part module to an optical pickup case, in which

FIGS. 7A to 7D show a still further embodiment of adhesively fixing a part module to an optical pickup case, in which

FIGS. 8A to 8G show a still further embodiment of adhesively fixing a part module to an optical pickup case, in which

DESCRIPTION OF THE PREFERRED EMBODIMENTS

Figure 1:
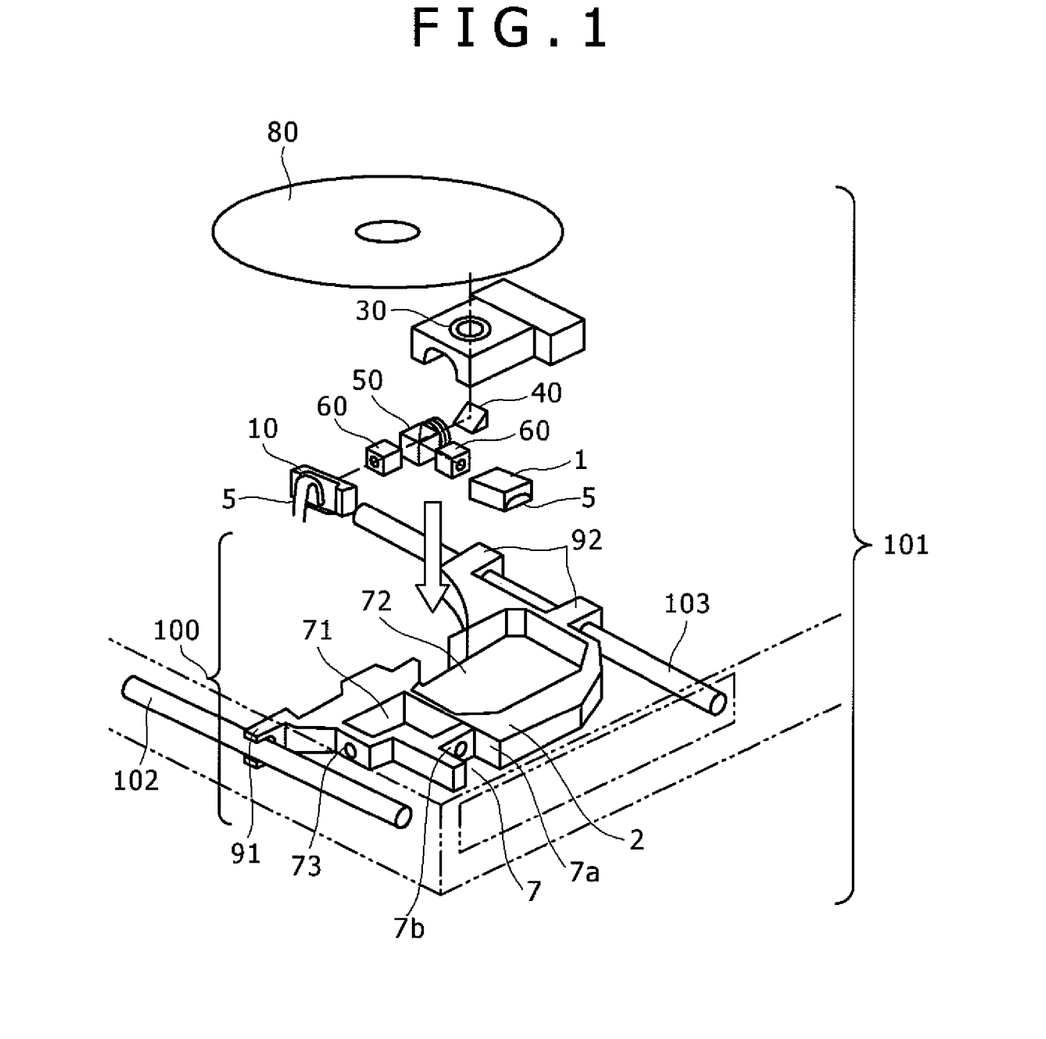
FIG. 1 shows an embodiment of an optical pickup device and an optical disk apparatus according to the invention.

The present invention is to be described by way of preferred embodiments with reference to the drawings. FIG. 1 is a schematic perspective view of an optical pickup device 100 according to each of embodiments of the invention and an optical disk drive unit 101 using the same.

As shown in FIG. 1, the optical pickup device 100 of the illustrated embodiment has an optical part module 1 for light emitting device using a laser diode as the light emitting device (hereinafter simply referred to as an optical part module), an optical pickup case 2, a photo-receiving optical part module 10, an objective lens 30, a reflection mirror 40, a prism 50, a lens 60, and a flexible printed substrate 5. The flexible printed substrate 5 is connected to both of the optical part modules 1, 10. The optical part module 10 converts a received optical signal into an electric signal and sends the signal by way of the flexible printed substrate 5 to the main body of the optical disk unit 101 assembled with the optical pickup device 100. On the other hand, the optical part module 1 converts an electric signal received from the main body of the optical disk unit 101 assembled with the optical pickup device 1 into an optical signal, thereby emitting a light.

The optical pickup case 2 has a first shaft holding portion 91, a second shaft holding portion 92, a first containment portion 71, a second containment portion 72, a third containment portion 7, and a bonding surface 73 for the photo-receiving optical part module 10.

The first shaft holding portion 91 and the second shaft holding portion 92 hold the shafts 102 and 103 of the optical disk drive unit assembled with the optical pickup device 100 respectively. The optical pickup device 100 moves along the shafts 102 and 103 under the control of the optical disk drive unit 101 assembled with the optical pick-up device 100. The prism 50 and the lens 60 are contained in the first containment portion 71. The objective lens 30 and the reflection mirror 40, etc. are contained in the second containment portion 72. Then, the optical part module 1 is adhesively fixed into the third containment portion 7.

A laser diode used as a light source of the optical pickup device 1 is modularized and mounted in the optical part module 1. An adherend material of the optical pickup case 2 for adhesively fixing the optical part module 1 includes a die cast or press molded product containing at least Zn, Mg, and Al as a main ingredient, or an injection molded product including PPS (polyphenylene sulfide) as a main ingredient. As an adhesive material 3 for bonding the optical part module 1 to the optical pickup case 2, a UV-ray curable adhesive is used generally. The invention is applicable to those including the constitutions described above, as well as to those using other inorganic materials such as metal materials and glass, resins, and adhesives.

Then, the invention is to be described by way of preferred embodiments.

[Embodiment 1]

Figures 2A, 2B, 2C:
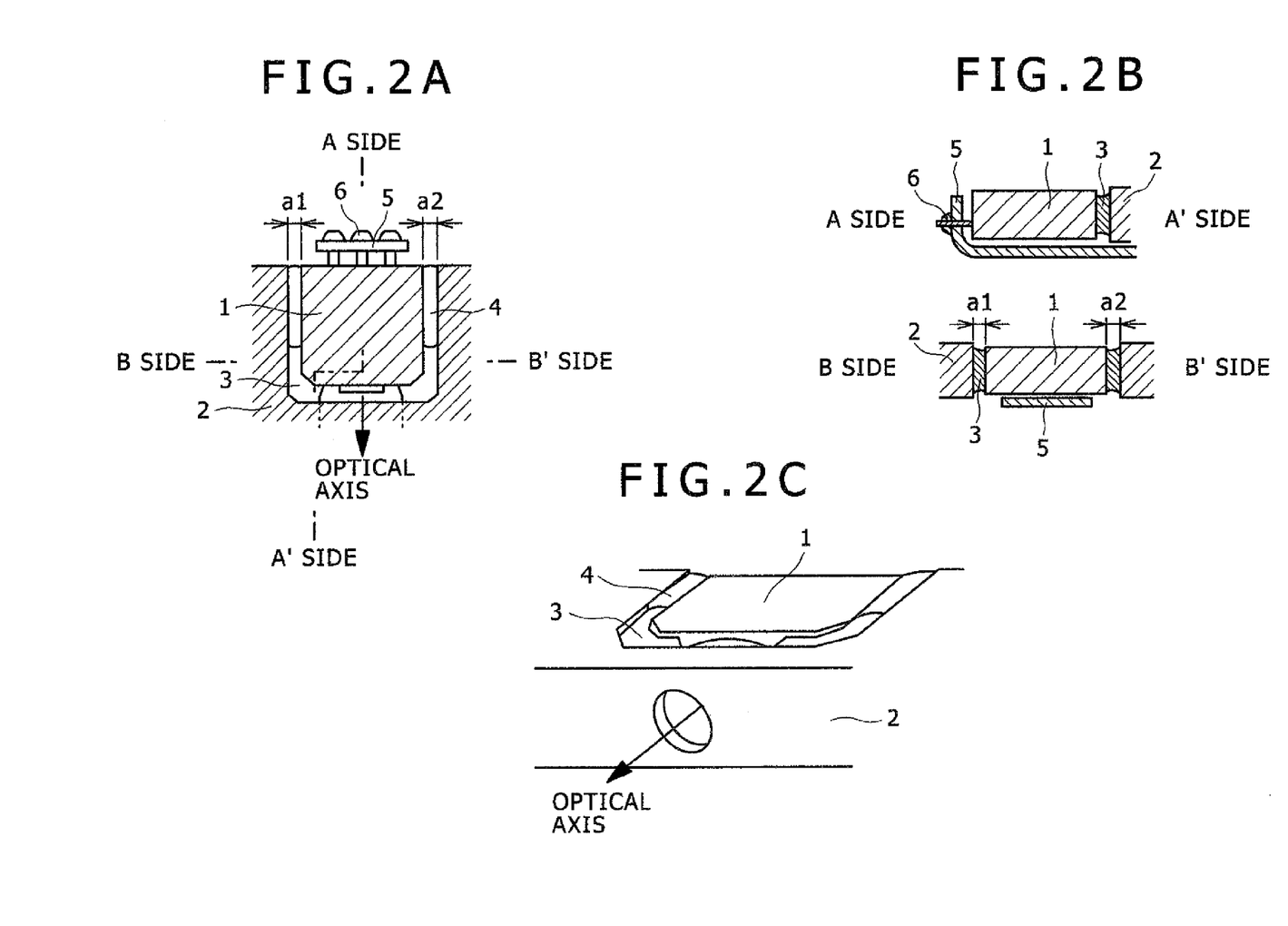
FIG. 2A is an upper plan view.
FIG. 2B is a cross-sectional view corresponding to FIG. 2A.
FIG. 2C is a perspective view for FIG. 2A.

This embodiment of the invention shows an example having a continuous bonding portion at one position including a lateral surface, a front surface, and a transition portion from the front surface to the lateral surface on one side and having two bonding portions on both sides putting the optical axis of the optical part module 1 therebetween. FIGS. 2A and 2B show structural views of adhesively fixing the optical part module 1 to an optical pickup case 2. FIG. 2A is an upper plan view, FIG. 2B is a cross sectional view corresponding to FIG. 2A, and FIG. 2C is a perspective view of FIG. 2A.

The optical part module 1 has a structure in which a back portion is connected to a flexible printed substrate 5 for obtaining an electric connection by using a lead free solder 6, a front portion is disposed at a predetermined position relative to the optical channel of the optical pickup case 2, and a bonding surfaces with the optical pickup case 2 (for lateral surfaces 7a and a front surface 7b of the third containment portion 7) at two positions putting the optical axis of the optical part module 1 therebetween. The optical part module 1 is disposed at an optimal position to the optical pickup case 2 with a view point of optical characteristics and adhesively fixed at two positions putting the optical axis of the optical part module 1 therebetween. Referring to the bonding surface, in each of the surfaces of the optical part module 1, a portion bonded to the front surface 7b of the third containment portion 7 is a front surface and a portion bonded to the lateral surface 7a thereof is a lateral surface. It also includes a transition portion from the front surface to the lateral surface. The transition portion and the lateral surface are referred to as "other than the front surface".

As the thickness of the optical pickup device 100 shown in FIG. 2 is reduced, in a case where a thin optical part module 1 is adhesively fixed only at the front surface, an optimal position can be maintained at a high positional accuracy against circumstantial changes. On the other hand, however, a bending moment due to a load from the flexible printed substrate 6 or due to an external load tends to exert on the bonding portion to increase a stress to the bonding portion. Further, in a case of adhesively fixing the optical part module 1 not only at the front surface but also at the lateral surface, while the resistance to the bending moment increases, a stress due to the circumstantial changes is generated directly to the bonding portion other than the front surface. Accordingly, in a case of adhesively fixing the optical part module 1 not only at the front surface but also at the lateral surface, it is necessary to greatly decrease the stress generated to the bonding portion 3 other than the front surface between the optical part module 1 and the optical pick-up case 2.

Then, the reason why the stress is generated by the circumstantial changes is to be described. The stress generated directly to the bonding portion other than the front surface between the optical part module 1 and the optical pick-up case 2 is caused as a tensile stress due to the difference of linear expansion coefficient of the adherend material of the optical part module 1 and the optical pickup case 2 and that of the adhesive 3, and the magnitude of the stress depends on the bonding distance L. This large tensile stress is a main cause for the peel of bonding. In addition, a larger shear stress is also generated at the bonding surface other than the front surface on the side of the optical pickup case 2 compared with the optical part module 1.

Then, in the structure of adhesively fixing the optical part module 1 at least at two positions putting the optical axis therebetween, the optical part module 1 is adhesively fixed such that the bonding surface of the optical part module 1 disposed at a position opposing to the bonding surface of the optical pickup case 2 includes the front surface and the surface other than the front surface of the optical part module 1, and the bonding distance L other than the front surface is: 40 μm<L<570 μm. The bonding distance L is represented by the relation of each of the shortest portions a1 and a2 for the bonding distance other than the front surface as shown in FIG. 2A and it is represented as: L=(a1+a2)/2.

570 μm as the maximum bonding distance is obtained as a result of an experiment. As the adhesive 3, an adhesive particularly, having a high glass transition temperature at which the bonding strength tends to be lowered comparatively, that is, an acrylic or epoxy type UV-ray curable adhesive with a linear expansion coefficient at a temperature from 30° C. to 65° C. of 90 ppm/K or less was used. As a result, while peel of bonding occurred by a ratio of several % at the bonding distance other than the front surface of 640 μm, it did not occur at that of 570 μm. The minimum bonding distance is preferably larger than 40 μm which is defined by the maximum size of a filler contained in the adhesive 3.

With the constitution described above, even when a stress should happen to be generated due to circumstantial changes, since the stress generated to the bonding boundary between the optical part module 1 and the optical pickup case 2, particularly, for the surface other than the front surface can be decreased greatly, peel of bonding can be prevented, and a high positional accuracy can be attained stably.

The range of the bonding surface described above is applicable either to usual acrylic or epoxy type UV-ray curable adhesive 3.

Further, in order that UV-rays, etc. can be irradiated sufficiently in the vertical direction for curing the adhesive 3, the cross sectional shape has a predetermined identical shape when cross sectioned at any position along the direction of the thickness of the optical pickup device 100 at least within a range of the bonding region. As a result, since a stable curing property for the adhesive 3 can be ensured, a high positional accuracy can be attained.

Further, the surface of the adhesion region of the optical part module 1 or the optical pickup case 2 is preferably subjected to a blasting treatment as usually adopted for die cast products to provide a fine unevenness of about several μm in average at the surface with a view point of bonding strength.

Further, it is necessary to efficiently conduct heat generated from the laser diode as the light source for the optical pickup device 100 to the optical pickup case 2. There are two heat conduction paths, one of them being a path by way of a heat dissipator 4 coated between the optical part module 1 and the optical pick-up case 2 and the other being a path of the heat dissipator 4 formed between the optical part module 1 and the upper and the lower surfaces of a metal cover (not illustrated) for conducting the heat by way of the metal cover formed to the upper and lower surfaces of the optical part module 1.

The material of the heat dissipator 4 includes a soft and flexible resin or an adhesive such as an olefinic resin, a rubber type silicone adhesive or a rubber type non-silicone adhesive as a matrix, and a highly heat conductive material filled therein at a high content, for example, spherical aluminum oxide (alumina), aluminum nitride, boron nitride, silicon nitride, magnesium oxide, crystalline or amorphous silica (silicon oxide), metal powder of silver, copper, etc., zinc oxide, or graphite. The heat dissipator is not very good for maintaining a high positional accuracy as in the case of the adhesive 3 but this is a material specialized to the function of heat dissipation.

[Embodiment 2]

Figure 3A:
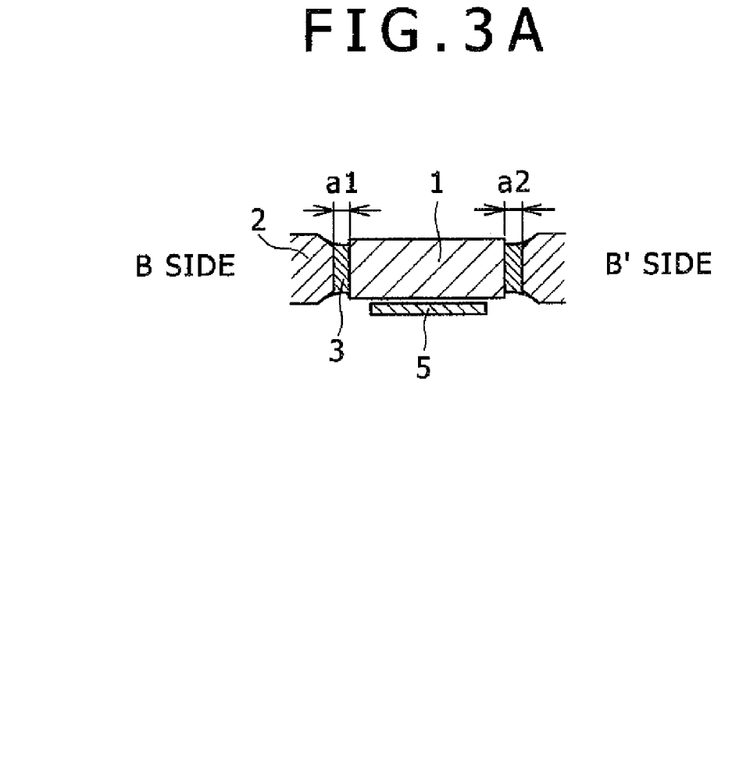
FIG. 3A is a cross sectional view of an example and FIG. 3B is a cross sectional view of another example.
Figure 3B:
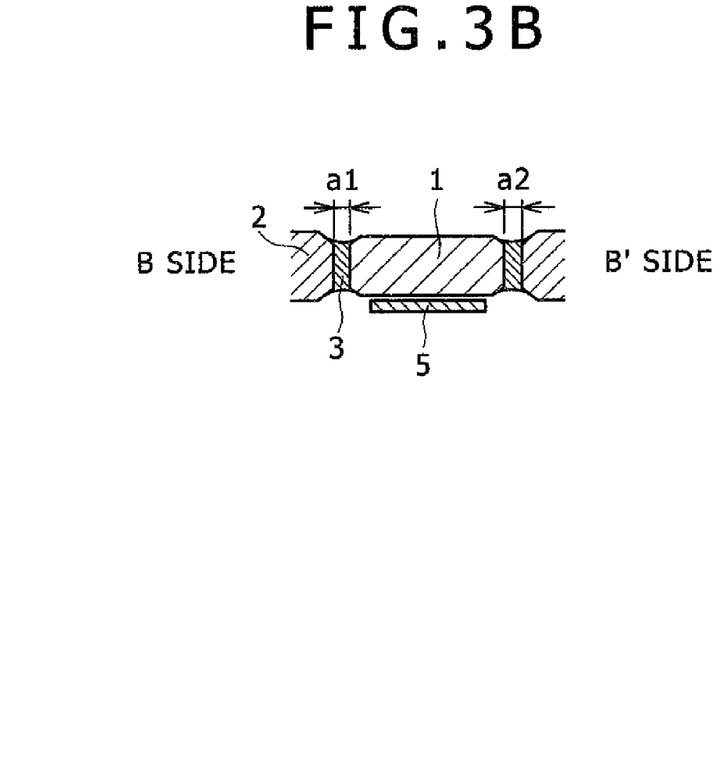

This embodiment shows an example of the optical pickup device 100 in which inclination is formed at least to the optical pickup case 2 at upper and lower parts of the bonding portion other than the front surface. FIGS. 3A and 3B show cross sectional structures in the bonding portion of the optical part module 1 in this embodiment. FIG. 3A shows an example of forming the inclination to the optical pickup case 2 and FIG. 3B shows another example of forming the inclination both to the optical pickup case 2 and the optical part module 1 in the optical pickup device 100.

As a result of disposing the inclination to the upper and lower parts of the bonding surface other than the front surface, since the stress due to the circumstantial changes can be decreased depending on the angle of the inclination, peel of bonding can be prevented and a high positional accuracy can be attained stably at the bonding distance L other than the front surface of the optical part module 1 within a range of: 40 μm<L<570 μm as in the case of Embodiment 1.

[Embodiment 3]

Figure 4:
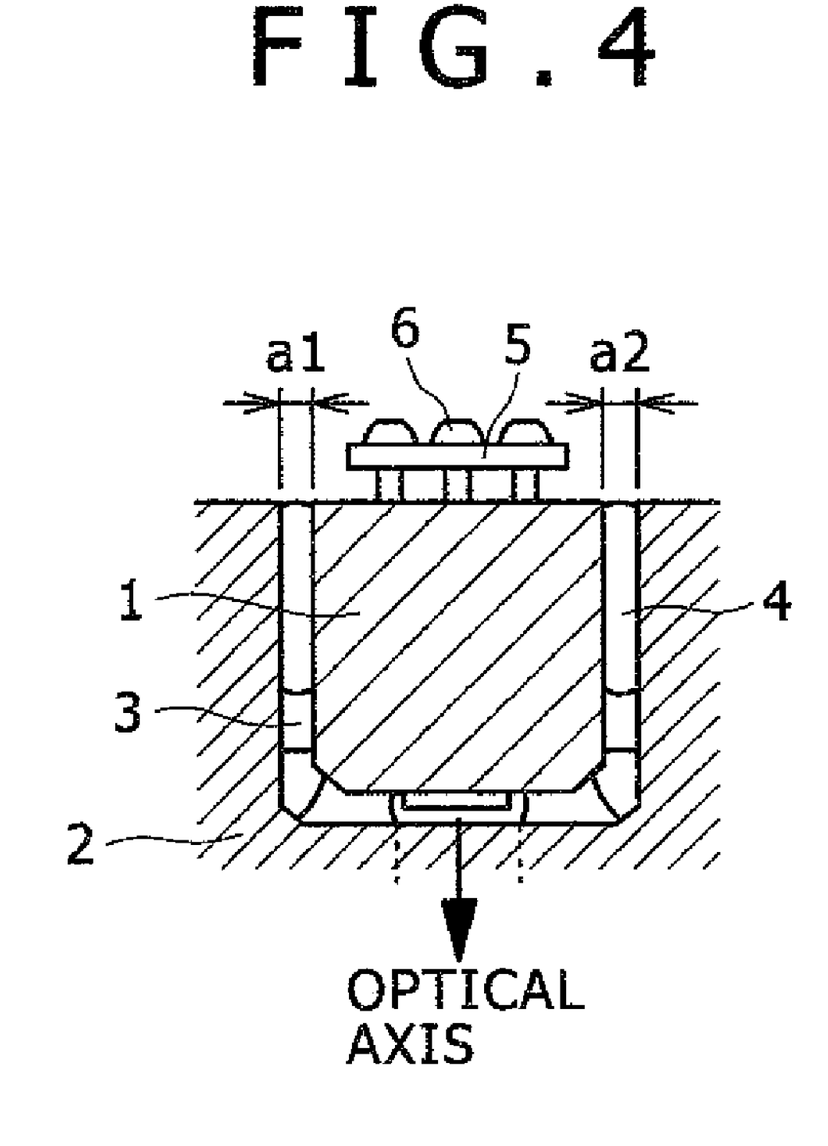
FIG. 4 is upper plan view for another embodiment of adhesively fixing a part module to an optical pickup case.

This embodiment, different from Embodiment 1, shows an example of disposing a heat dissipator to the transition portion and adhesively fixing the optical part module 1 at least at two positions of the lateral surface and at two positions of the front surface putting the optical axis therebetween. FIG. 4 is an upper plan view of the optical part module 1 for the bonding portion in which the module is adhesively fixed at one position for each of the lateral surfaces and the front surface, that is, at two positions on one side in total and, accordingly, at four positions on both sides in total.

As a result, also in this embodiment, peel of bonding can be prevented and a high positional accuracy can be attained stably at the bonding distance other than the front surface of the optical part module 1 within a range of: 40 μm<L<570 μm as in the case of Embodiment 1.

[Embodiment 4]

Figure 5A:
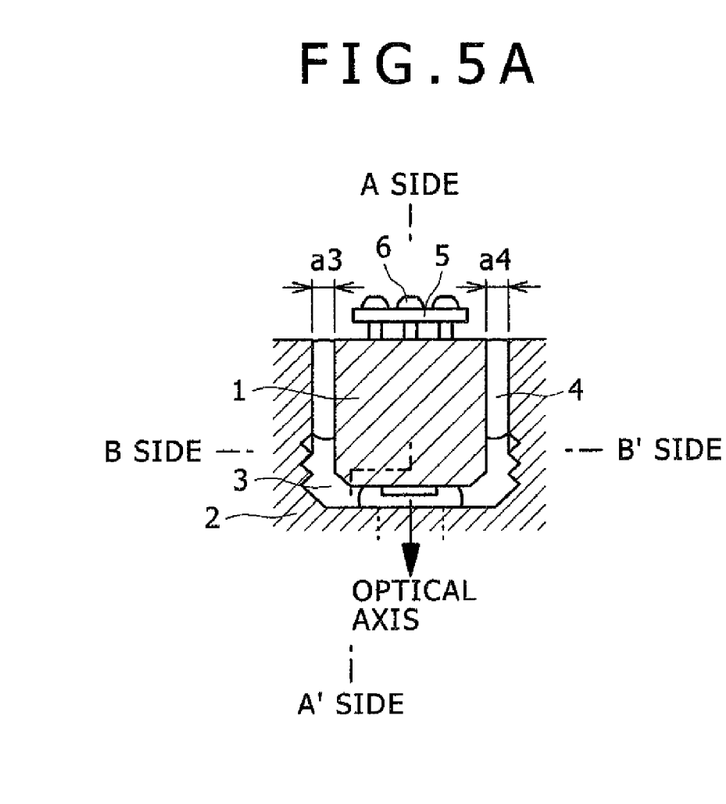
FIG. 5A is an upper plan view thereof.
Figure 5B:
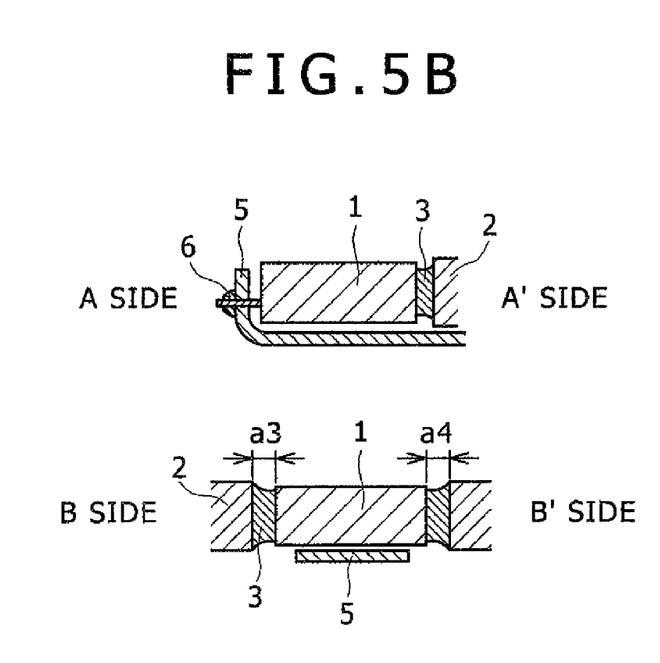
FIG. 5B is a cross sectional view thereof.

This embodiment shows, different from Embodiments 1 to 3 described above, an example in which a concave portion or a convex portion is formed at least in the optical pickup case 2 at the bonding portion other than the front surface. FIG. 5 shows a structural example for an embodiment of an optical pickup device 100 having a continuous bonding surface including a front surface and a surface other than the front surface at one position on each side putting the optical axis of the optical part module 1 therebetween and having bonding surfaces at two positions on both sides. FIG. 5A is an upper plan view and FIG. 5B is a cross sectional view corresponding to FIG. 5A.

Also in this embodiment, like in the case of Embodiment 1, it is necessary to attain a high positional accuracy stably against the circumstantial changes also in a case of bonding the optical part module 1 at least at two positions putting the optical axis therebetween and bonding the front surface and the surface other than the front surface, and the mechanism of the stress that is generated in the bonding portion and hinders the accurate positioning is as has been described with respect to Embodiment 1.

Then, in the structure of adhesively fixing the optical part module 1 at least at two positions putting the optical axis therebetween, the optical part module 1 is adhesively fixed such that the bonding surface of the optical part module 1 disposed at a position opposing to the bonding surface of the optical pickup case 2 includes the front surface and the surface other than the front surface of the optical part module 1, the bonding surface is configured to form a concave portion or a convex portion at least to a portion of the bonding surface other than the front surface of the optical pickup case 2 and the bonding distance L other than the front surface is: 40 μm<L<950 μm. The bonding distance L is represented by the relation of each of the shortest portions a3 and a4 for the bonding distance other than the front surface as shown in FIG. 5A and it is represented as: L=(a3+a4)/2.

950 μm as the maximum bonding distance is obtained as a result of an experiment. As the adhesive 3, an adhesive, particularly, having a high glass transition temperature at which the bonding strength tends to be lowered comparatively, that is, an acrylic or epoxy type UV-ray curable adhesive with a linear expansion coefficient at a temperature from 30° C. to 65° C. of 90 ppm/K or less was used. As a result, while peel of bonding occurred by a ratio of several % at the bonding distance for the surface other than the front surface of 1050 μm, it did not occur at that of 950 μm.

The minimum bonding distance is preferably larger than 40 μm which is defined by the maximum size of a filler contained in the adhesive 3. In this case, the step difference due to the concave portion or the convex portion formed at least to the optical pickup case 2 at the portion of the bonding surface other than the front surface is preferably larger than the maximum filler size of 40 μm of the adhesive 3 in order to ensure good bonding strength.

In this embodiment, the maximum bonding distance is enlarged compared with that in Embodiments 1 to 3. This is because even when a further larger tensile strength should happen to be generated to the bonding surface other than the front surface on the side of the optical pickup case 2, development of cracks can be prevented by the unevenness thereby improving the bonding strength by the structure of forming the concave portion or the convex portion to the bonding surface other than the front surface of the optical pickup case 2. Accordingly, for the optical pickup case 2 in which a larger tensile stress or shear stress is generated at least to the bonding surface other than the front surface, a structure of forming the concave portion or the convex portion at the bonding surface other than the front surface of the optical pickup case 2 is preferred. Further, by defining the bonding distance L for the surface other than the front surface of the optical part module 1 to less than 950 μm, tensile stress, etc. generated in the bonding boundary can be decreased and the peel of bonding can be prevented to attain a higher positional accuracy stably.

With the constitution described above, even when a stress should happen to be generated by circumstantial changes, since the stress generated at the bonding boundary between the optical part module 1 and the optical pickup case 2, particularly, the surface other than the front surface can be decreased greatly and the strength can be improved by preventing development of cracks, peel of bonding can be prevented and a high positional accuracy can be attained stably.

The range of the bonding distance described above is applicable either to usual acrylic or epoxy type UV-ray curable adhesive 3.

Further, in order that UV-ray, etc. can be irradiated sufficiently in the vertical direction for curing the adhesive 3, the cross sectional shape has a predetermined identical shape when cross sectioned at any position along the direction of the thickness of the optical pickup device 100 at least in a range of the bonding region. As a result, since a stable curing property for the adhesive 3 can be ensured, a high positional accuracy can be attained stably.

Further, considerations for the surface treatment for the bonding region of the optical part module 1 or the optical pickup case 2 and the heat dissipator 4 are identical with those in Embodiments 1 to 3.

[Embodiment 5]

Figure 6A:
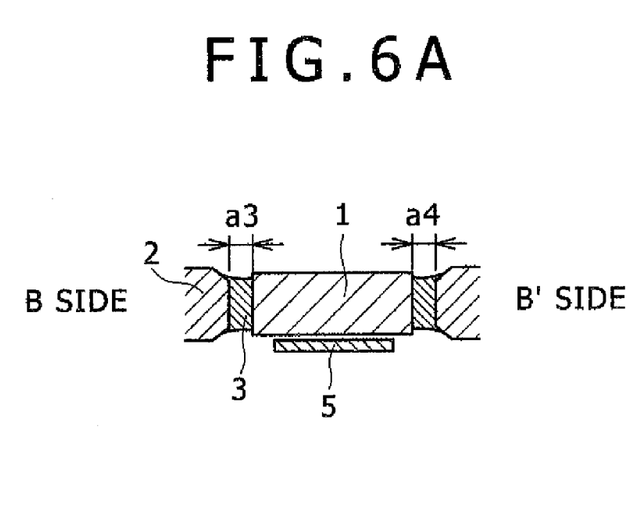
FIG. 6A is a cross sectional view showing an example of this embodiment and FIG. 6B is a cross sectional view showing another example of this embodiment.
Figure 6B:
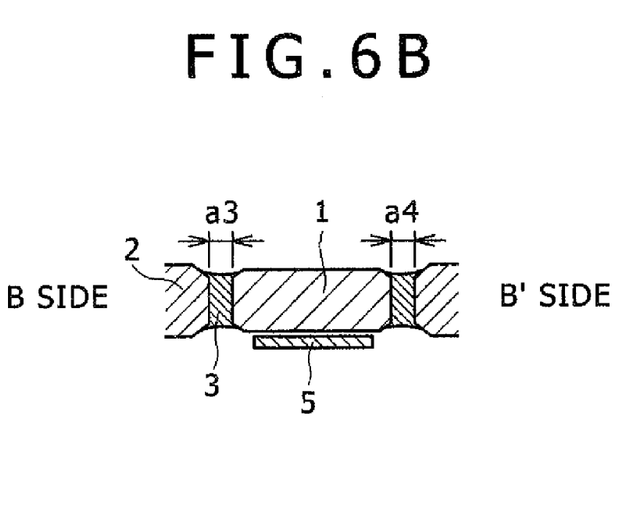

This embodiment is an example of an optical pickup device 100 of forming an inclination at least to the optical pickup case 2 for upper and lower parts of the bonding portion other than the front surface in addition to Embodiment 4, as in the relationship of Embodiment 2 to Embodiment 1. FIGS. 6A and 6B show cross sectional structures at the bonding portion of the optical part modules 1 in this embodiment. This embodiment shows an example of the optical pickup device 100 in which FIG. 6A shows an example of forming the inclination to the optical pickup case 2 and FIG. 6B shows an example of forming the inclination to both the optical pickup case 2 and the optical part module 1.

As a result of disposing the inclination to the upper and lower parts of the bonding surface other than the front surface, since the stress due to the circumstantial changes can be decreased depending on the angle of the inclination, peel of bonding can be prevented and a high positional accuracy can be attained stably at the bonding distance other than the front surface of the optical part module 1 within a range of: 40 μm<L<950 μm as in the case of Example 1.

[Embodiment 6]

This embodiment shows an example of forming unevenness to the optical pickup case 2 as in the case of Embodiment 4.

Figure 7A:
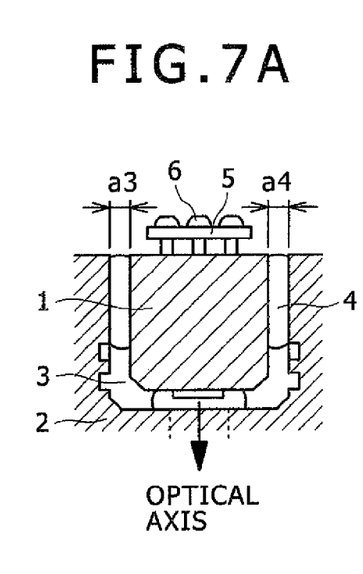
FIG. 7A is an upper plan view showing an example of this embodiment.
Figure 7B:
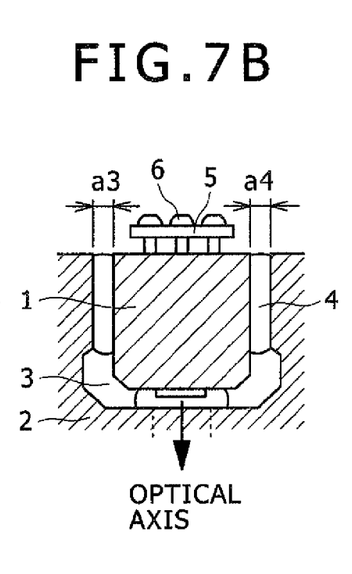
FIG. 7B is an upper plan view showing another example of this example.
Figure 7C:
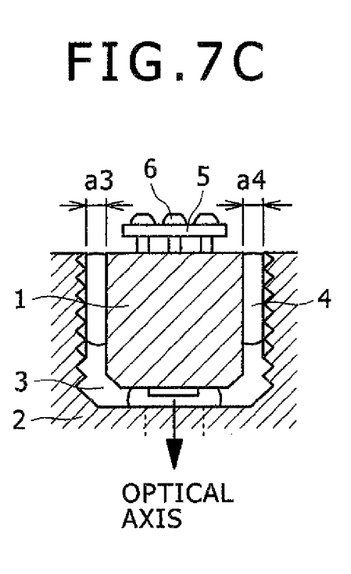
FIG. 7C is an upper plan view showing a further example of this embodiment.
Figure 7D:
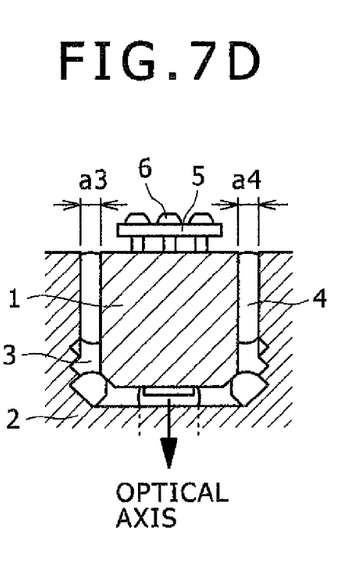
FIG. 7D is an upper plan view showing a further example of this embodiment.

FIG. 7A shows an example of forming plural small concave portions to the bonding surface other than the front surface of the optical pickup case 2 thereby preventing development of cracks. FIG. 7B shows another example of forming plural large concave portions to the bonding surface other than the front surface of the optical pickup case 2 thereby preventing development of cracks. FIG. 7C shows other example of forming saw teeth-like unevenness from the bonding surface other than the front surface to a portion of coating a heat dissipator 4 of the optical pickup case 2 thereby preventing development of cracks. FIG. 7D shows a further example of forming a heat dissipator 4 to the transition portion and adhesively fixing the optical part module 1 at two positions on each side 2, that is, at 4 positions in total putting the optical axis therebetween.

Also in this embodiment, since development of cracks can be inhibited by the unevenness thereby improving the bonding strength as in the case of Embodiment 4 by forming the concave portion or the convex portion to the bonding portion other than the front surface of the optical part module 1, peel of bonding can be prevented and high positional accuracy can be obtained stably at the bonding distance L other than front surface of the optical part module 1 within the range of: 40 μm<L<950 μm.

[Embodiment 7]

While unevenness is formed to the optical pickup case 2 in Embodiment 4 and Embodiment 6, this embodiment shows examples of forming the unevenness to both of the optical pickup case 2 and the optical part module 1.

Figure 8A:
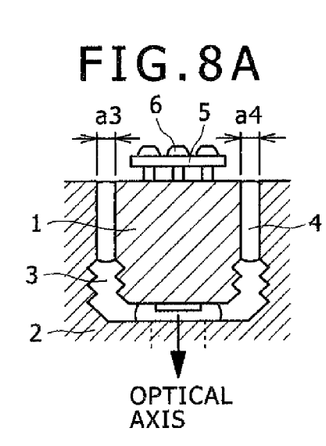
FIG. 8A is an upper plan view showing an example of this embodiment.
Figure 8B:
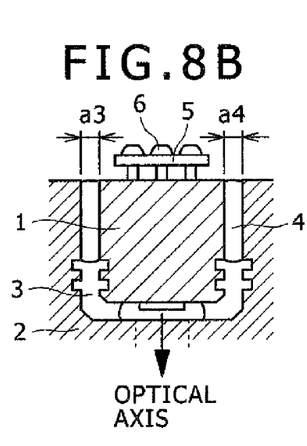
FIG. 8B is an upper plan view showing another example of this embodiment.
Figure 8C:
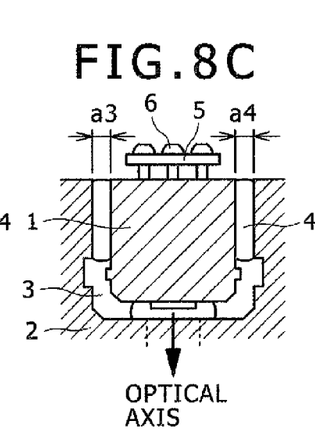
FIG. 8C is an upper plan view showing another example of this embodiment.
Figure 8D:
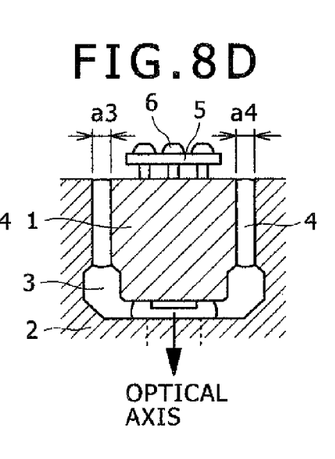
FIG. 8D is an upper plan view showing a further example of this embodiment.
Figure 8E:
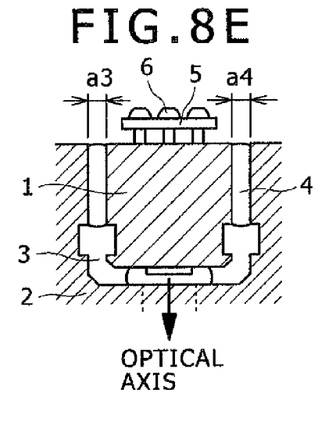
FIG. 8E is an upper plan view showing a still further example of this embodiment.
Figure 8F:
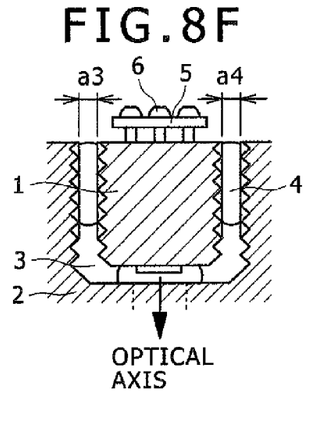
FIG. 8F is an upper plan view showing a still further example of this embodiment.
Figure 8G:
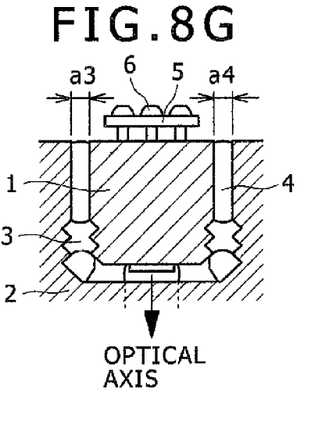
FIG. 8G is an upper plan view showing a still further example of this embodiment.

FIG. 8A shows an example of forming a saw-teeth like unevenness to the bonding surface other than the front surface. FIG. 8B shows an example of forming plural small concave portions, instead of the saw-teeth like shape in FIG. 8A, to the bonding surface other than front surface thereby preventing development of cracks. FIG. 8C shows an example of shaping the bonding surface other than the front surface by forming a concave portion to the bonding surface of one of the optical pickup case 2 and the optical part module 1 and forming a convex portion to the bonding surface of the other, thereby preventing development of cracks. FIG. 8D and FIG. 8E show examples of forming a large concave portion to the bonding surface other than the front surface of both of the optical pickup case 2 and the optical part module 1 thereby preventing development of cracks. FIG. 8F shows an example of forming a saw-teeth-like unevenness also to a portion for coating the heat dissipator 4 on both lateral surfaces of the optical part module 1 and the optical pickup case 2 thereby preventing development of cracks. FIG. 8G shows an example of disposing a heat dissipator 4 to a transition portion and adhesively fixing the optical part module 1 at two positions on each one side, that is, four positions in total putting the optical axis therebetween.

As described above, in the structure of adhesively fixing the optical part module 1 at least at two positions putting the optical axis therebetween, since the bonding surface of the optical part module 1 disposed at a position opposing to the bonding surface of the optical pickup case 2 includes the front surface and the surface other than the front surface of the optical part module 1, and the bonding surface is configured such that the concave portion or the convex portion is formed to the portion at the bonding surface other than the front surface of both of the optical part module 1 and the optical pickup case 2, development of cracks can be prevented not only for the bonding surface other than the front surface of the optical pickup case 2 but also for the bonding surface other than the front surface of the optical part module 1, and an optical pickup device 100 of higher quality with further improvement for impact resistance, etc. can be provided.

Accordingly, also in this embodiment, since the development of cracks can be inhibited by the unevenness as in the case of Embodiment 4, peel of bonding can be prevented by decreasing the stress due to circumstantial changes and improving the strength by the prevention of development of cracks, and high positional accuracy can be attained stably at the bonding distance L other than the front surface of the optical part module 1 within the range of: 40 μm<L<950 μm.

In the embodiments described above, while the bonding surface is disposed also to the front surface, this is not always necessary.

An optical part module having a modularized laser diode used as a light source for the optical pickup device is an important part that gives significant effects on the optical pickup device. Accordingly, the technique capable of adhesively fixing the optical part module to the optical pickup case to an optimal position at a high positional accuracy is an important technique for attaining high quality and high performance.

What is claimed is:

1. An optical pickup device having at least an optical part module and an optical pickup case to which the optical part module is adhesively fixed by an adhesive, in which a bonding surface of the optical part module to the optical pickup case is disposed at least at two positions, each on lateral surfaces of the optical part module putting an optical axis of the optical part module therebetween, a concave portion or a convex portion is formed to the bonding surface of at least one of the optical part module and the optical pickup case, and a bonding distance L at the lateral surface between the optical part module and the optical pickup case is within a range of: 40 μm<L<950 μm;

wherein a heat dissipator is disposed to a transition portion from the front surface to the lateral surface and to a portion other than the bonding surface of the lateral surface of the optical part module and between the optical part module and the optical pickup case, and a concave portion or a convex portion is formed to a surface of the heat dissipator to at least one of the optical part module and the optical pickup case.

2. An optical pickup device, comprising:

an optical part module; and an optical pickup case, to which the optical part module is adhesively fixed by an adhesive;

wherein a bonding surface of the optical part module, for adhesively fixing to the optical pickup case, is disposed at each of at least two opposing parallel lateral surfaces of the optical part module, thereby putting an optical axis of the optical part module therebetween;

wherein a bonding distance L between the optical part module and the optical pickup case is within a range of: 40 μm<L<950 μm; and wherein a heat dissipator is disposed between opposing parallel lateral surfaces of the optical part module and the optical pickup case, respectively, and/or between a surface of the optical pickup case and a front surface of the optical part module.

3. An optical pickup device, comprising:
an optical part module; and
an optical pickup case, to which the optical part module is adhesively fixed by an adhesive;
wherein a bonding surface of the optical part module, for adhesively fixing to the optical pickup case, is disposed at each of at least at two opposing parallel lateral surfaces of the optical part module, thereby putting an optical axis of the optical part module therebetween;
wherein a bonding distance L between the optical part module and the optical pickup case is within a range of: 40 μm<L<950 μm; and
wherein a concave portion is formed into, or a convex portion is formed onto, a bonding surface of at least one of the optical part module and the optical pickup case.

* * * * *